US006190254B1

(12) United States Patent
Bennett

(10) Patent No.: US 6,190,254 B1
(45) Date of Patent: Feb. 20, 2001

(54) SLOT MACHINE GAME WITH DYNAMIC SPECIAL SYMBOLS

(75) Inventor: Nicholas Luke Bennett, Manly Vale (AU)

(73) Assignee: Aristarat Leisure Industries, Pty Ltd, New South Wales (AU)

( * ) Notice: Under 35 U.S.C. 154(b), the term of this patent shall be extended for 0 days.

(21) Appl. No.: 09/125,485

(22) PCT Filed: Feb. 21, 1997

(86) PCT No.: PCT/AU97/00103

§ 371 Date: Aug. 18, 1998

§ 102(e) Date: Aug. 18, 1998

(87) PCT Pub. No.: WO97/31344

PCT Pub. Date: Aug. 28, 1997

(30) Foreign Application Priority Data

Feb. 23, 1996 (AU) .................................................. PN 8276

(51) Int. Cl.[7] .............................. G07F 17/34; A63F 13/00

(52) U.S. Cl. .......................... 463/13; 463/20; 273/143 R; 273/292

(58) Field of Search ............................ 273/143 R, 138.1, 273/138.2, 292; 463/20, 13, 25

(56) References Cited

U.S. PATENT DOCUMENTS 4,695,053 9/1987 Vazques et al. ................. 273/143 R
4,700,948 * 10/1987 Okada .............................. 273/143 R
5,019,973 * 5/1991 Wilcox et al. .......................... 364/12
5,332,219 * 7/1994 Marnell, II et al. ................... 463/13
5,431,408 * 7/1995 Adams ................................ 273/306
5,580,053 * 12/1996 Crouch .................................. 463/20
5,603,659 * 2/1997 Okada .................................... 463/25
5,947,821 * 9/1999 Stone ..................................... 463/13

FOREIGN PATENT DOCUMENTS 6303590 9/1990 (AU) .
0558307 2/1993 (EP) .
2105891 8/1981 (GB) .
2098778 4/1982 (GB) .

* cited by examiner

*Primary Examiner*—Benjamin H. Layno
(74) *Attorney, Agent, or Firm*—Rosenman & Colin, LL

(57) ABSTRACT

A slot machine 20 provides a plurality of rotatable reels 30 carrying symbols 31 is arranged to pay a prize on the occurrence of a predetermined symbol or combination of symbols. As well as the predetermined prize winning combinations listed on the artwork 35 of top box 32, a special symbol display 33 is provided within the artwork panel to display a special symbol for use in determining additional winning combinations. Typically, the special symbol will be used as a wildcard symbol such that when a game is played any occurrence of the currently displayed wildcard symbol in the game display will count as any other symbol when determining if any winning combinations have occurred.

45 Claims, 3 Drawing Sheets

SLOT MACHINE GAME WITH DYNAMIC SPECIAL SYMBOLS

INTRODUCTION

The present invention relates to gaming machines of the type arranged to play a game of poker and in particular the invention provides an improvement to a game played on such a machine.

Players who regularly play gaming machines quickly tire of particular games and therefore it is necessary for manufacturers of these machines to come up with innovative game features that add interest to the games provided on such machines in order to keep the players amused and therefore willing to continue playing the game.

DESCRIPTION OF THE PRIOR ART

Gaming or poker machines have been well known in the state of New South Wales for many years and have more recently gained considerable popularity throughout Australia, with quite substantial amounts of money wagered on these machines. There is a growing tendency for State Governments to legalise the use of gaming machines by licensing operators, with resulting revenue gains through licence fees and taxation of monies invested. The licensed operation of gaming machines is the subject of State legislation and regulation. This regulation most always dictates a maximum percentage payout for a gaming machine. For example, a maximum of 85% of monies invested must be returned as winnings, and manufacturers of gaming machines therefore must design their machines around these regulatory controls.

With the growth that has occurred in the gaming machine market there is intense competition between manufacturers to supply the various existing and new venues. When selecting a supplier of gaming machines, the operator of a venue will often pay close attention to the popularity of various games with their patrons. Therefore, gaming machine manufacturers are keen to devise games which are popular with players, as a mechanism for improving sales.

Many various strategies have been tried in the past to make games more enticing to players, including the commonly known double-up feature, whereby, if a player wins a particular game, they can then risk the winnings of that game in a double-or-nothing mode in which they gamble on a subsequent, and often different, game such as whether a red or black card will be the next card drawn.

Other techniques adopted in the past have been to provide complexity in the numbering and combinations of indicia which would result in a win, thereby hoping to convince the player that there is a greater chance of winning and to keep their interest in a particular game.

The present invention provides an arrangement in which the values of special symbols such as wildcard and "scatter" symbols are dynamically allocated during each game.

SUMMARY OF THE INVENTION

The present invention consists in a gaming machine having display means, and game control means arranged to control images displayed on the display means, the game control means being arranged to play a game wherein a plurality of symbols are randomly selected and displayed on the display means and, if a winning combination results, the machine pays a prize, the game being characterised in that the gaming machine is provided with special symbol display means arranged to display a value of a special symbol to be used in the game, and the control means being arranged to select and display the special symbol on the special symbol display means during each game and to use the special symbol when determining if the plurality of symbols include a winning combination.

The present invention is applicable to gaming machines of the traditional poker machine style (also known as poker machine or fruit machines) in which the display means comprises a set of rotatable reels, each carrying a plurality of symbols, or a video simulation thereof. The invention is equally applicable to video draw poker machines in which a poker hand is displayed on the screen, the cards of the hand being selected from a standard 52 or 53 card deck.

In one embodiment, the special symbol is used as a wildcard symbol which can substitute for any other symbol to form a winning combination.

In another embodiment, the special symbol is used as a scatter symbol such that a scattered combination of the special symbols with one such symbol in each column, but not all located in any one of the predetermined paying arrangements, will pay a special "scattered" prize. The special symbol can also be used as a bonus symbol or a jackpot symbol, such that if the special symbol is included in a winning combination respectively a bonus function or a jackpot function will be invoked.

In embodiments of the invention which employ rotating reels as the display device, an auxiliary display is required to display the special symbol. This may take the form of a liquid crystal display built into the score card artwork. In the case of a video machine, the special symbol is preferably displayed on the video screen when the winning symbol or combination is displayed.

BRIEF DESCRIPTION OF THE DRAWINGS

An embodiment of the invention will now be described, by way of example with reference to the accompanying drawings, in which.

DETAILED DESCRIPTION OF THE PREFERRED EMBODIMENTS

In the following detailed description the methodology of the embodiments will be described, and it is to be understood that it is within the capabilities of the non-inventive worker in the art to introduce the methodology on any standard microprocessor-based gaming machine by means of appropriate programming.

Figure 1:
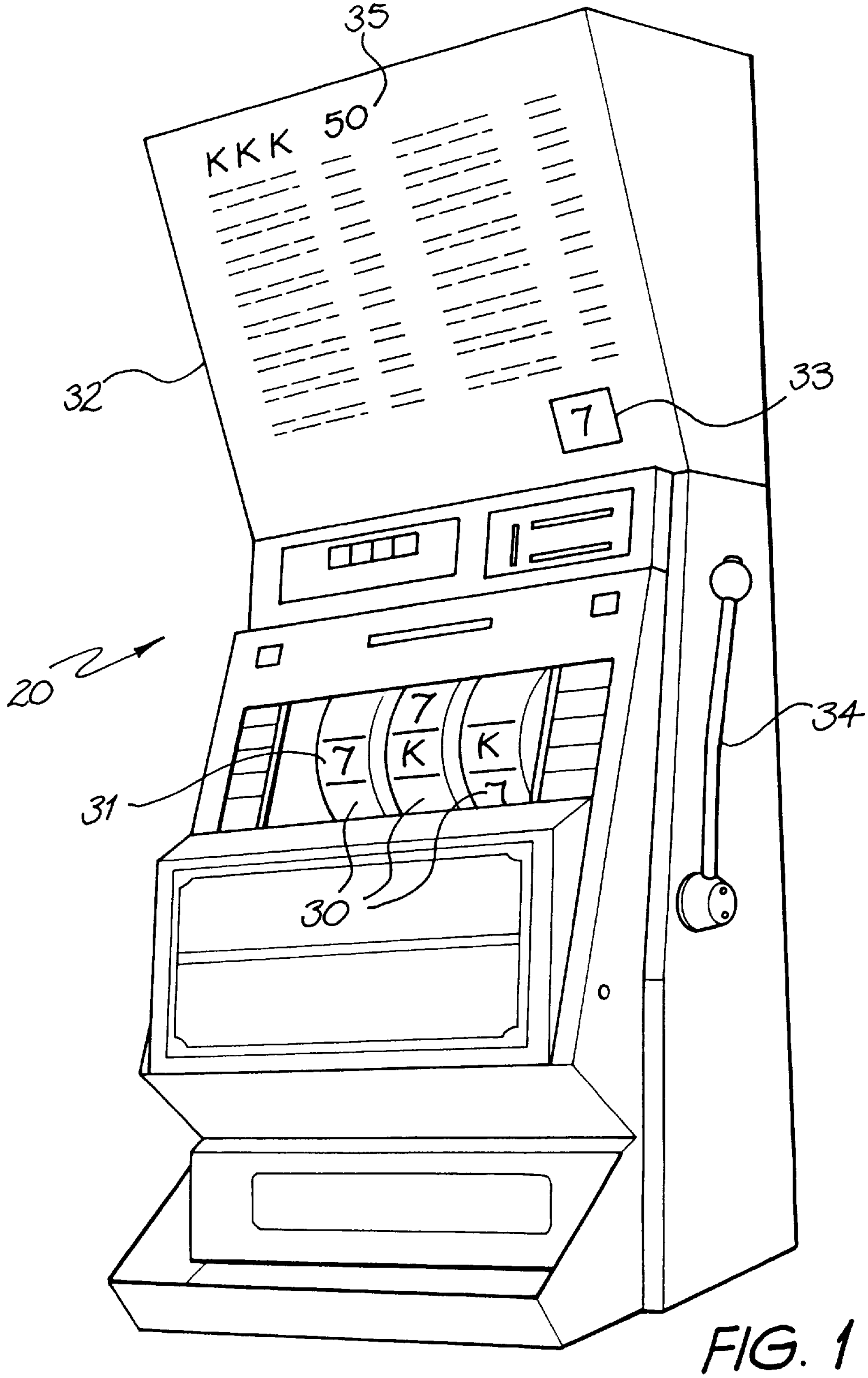
FIG. 1 illustrates a gaming machine with rotating reel display incorporating a first embodiment of the invention.

Referring to FIG. 1 of the drawings, the first embodiment of the invention is illustrated in which a slot machine 20 of the type having a plurality of rotatable reels 30 carrying symbols 31 is arranged to pay a prize on the occurrence of a predetermined symbol or combination of symbols. As well as the predetermined prize winning combinations listed on the artwork 35 of top box 32, a special symbol display 33 is provided within the artwork panel to display a special symbol for use in determining additional winning combinations.

Typically, the special symbol will be used as a wildcard symbol such that when a game is played any occurrence of the currently displayed wildcard symbol in the game display will count as any other symbol when determining if any winning combinations have occurred. In the embodiment of FIG. 1, in the illustrated game the current special symbol displayed is a 7 and this may substitute for any other symbol, such as a King, to provide a winning combination. In this case, the 7 combines with two Kings on the centre line which pays the same prize as three Kings.

In another game style, the special symbol is used to indicate a symbol that will pay a prize even if its occurrence is scattered across the display in an otherwise non-winning combination. Typically, to win a "scattered" prize there must be one occurrence of the symbol in each column of the display. In the embodiment of FIG. 1, if the special symbol were used to provide a "scattered" function, a prize would be won for having scattered sevens (centre line of first column, top line of second column and bottom line of third column).

Many styles of bonus function are known in prior art slot machines, such as machines which provide free games when a particular combination is achieved. Typically, such bonus schemes are invoked when the player achieves a complete row of a particular predefined symbol. The special symbol display of the present invention can be used in such games to dynamically select the symbol that must be displayed to invoke the bonus scheme.

Jackpot machines are also known in which a jackpot prize builds up over a period of time, by incrementing the jackpot prize by a small amount each time a player plays the particular machine, or in the case of linked machines, every time a player plays one of the linked machines. The jackpot is typically awarded when a particular predetermined combination of symbols is displayed in a game. In embodiments of jackpot style games according to the present invention, the jackpot is won when a machine displays a predetermined combination including the special symbol displayed in display 33.

In the slot machine 20 illustrated in FIG. 1, the game is initiated by a pull handle 34, however, it will be recognised by persons skilled in the art that this operating mechanism might be replaced by a push button actuator in other embodiments of the invention.

The top box 32 on top of the slot machine 20 carries the artwork panel 35 which displays the various winning combinations for which a prize is paid on this machine, and in particular includes a display window 33 in which is displayed the variable special symbol associated with each game and which may be used as a "wildcard", "scattered", "bonus", or "jackpot" symbol depending on the style of game provided on the machine. During each operation of the machine the special symbol window will change to display a new special symbol valve, such as a seven, as illustrated in the example game displayed in FIG. 1.

The special symbol may be calculated as a random number or alternatively it may be calculated using a formula based on pay history of the machine in which the feature is fitted, such that the percentage return of the machine may be regulated, by selecting special symbols having a higher probability of occurrence in a game, when the payout history of the machine has been low and by selecting special symbols having a lower probability of occurrence in a game when the payout history of the machine has been high.

Figure 2:
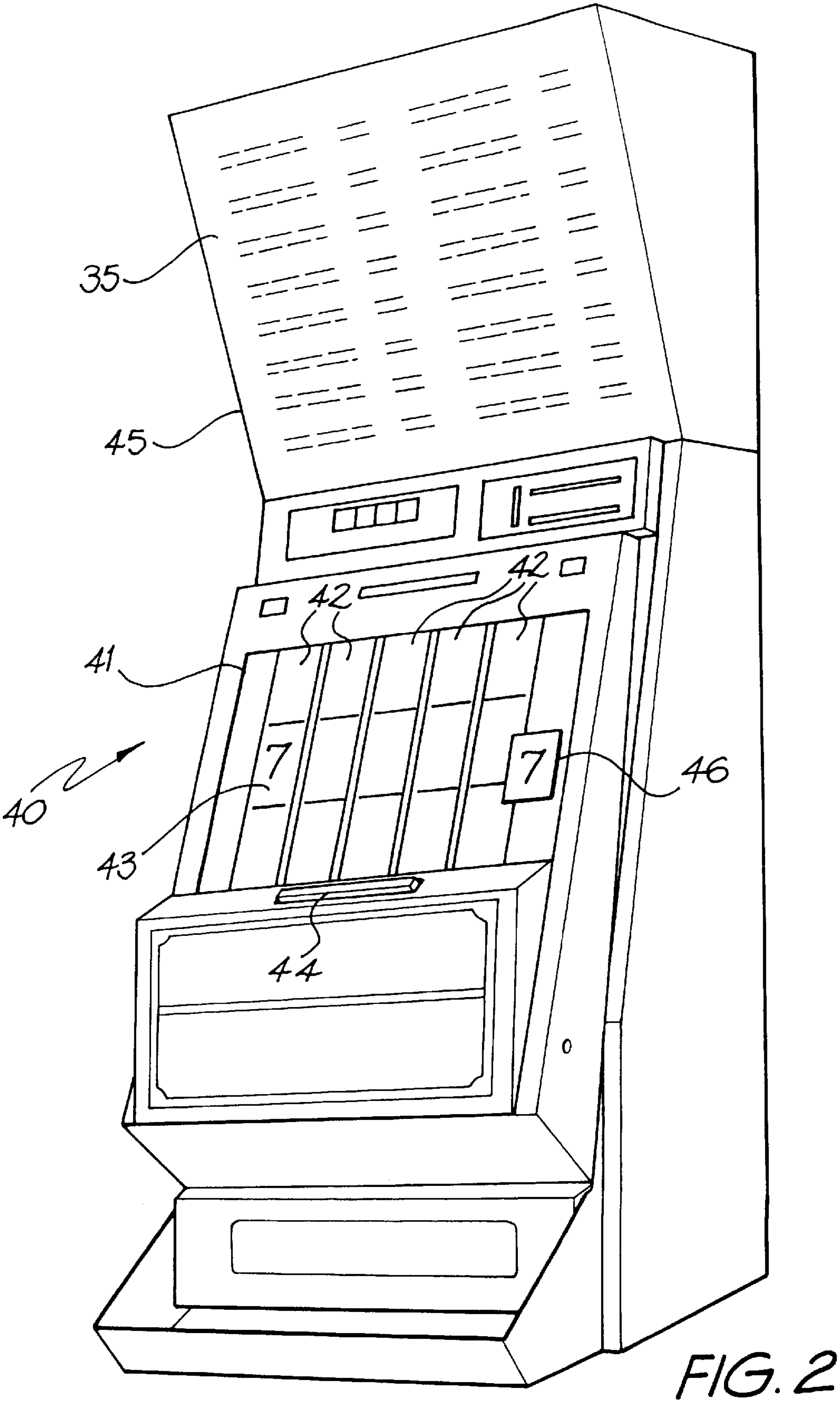
FIG. 2 illustrates a gaming machine with a video simulation of a rotating reel display incorporating the first embodiment of the invention.

Turning to FIG. 2, a video version of the embodiment of FIG. 1 is illustrated, in which a slot machine 40 is provided with a video screen 41 on which spinning reels 42 are simulated, each of the spinning reels having a plurality of symbols 43 similar to the physical symbols in the embodiment of FIG. 1. Games on this machine are initiated by operation of a button 44 below the video screen.

The top box 45 again carries an artwork panel 35 which displays information about prize winning combinations and in this instance would include information about the function of the special symbol but not the special symbol display 33 of FIG. 1. Rather, the special symbol is displayed in a pseudo window 46 provided on the video screen.

Figure 3:
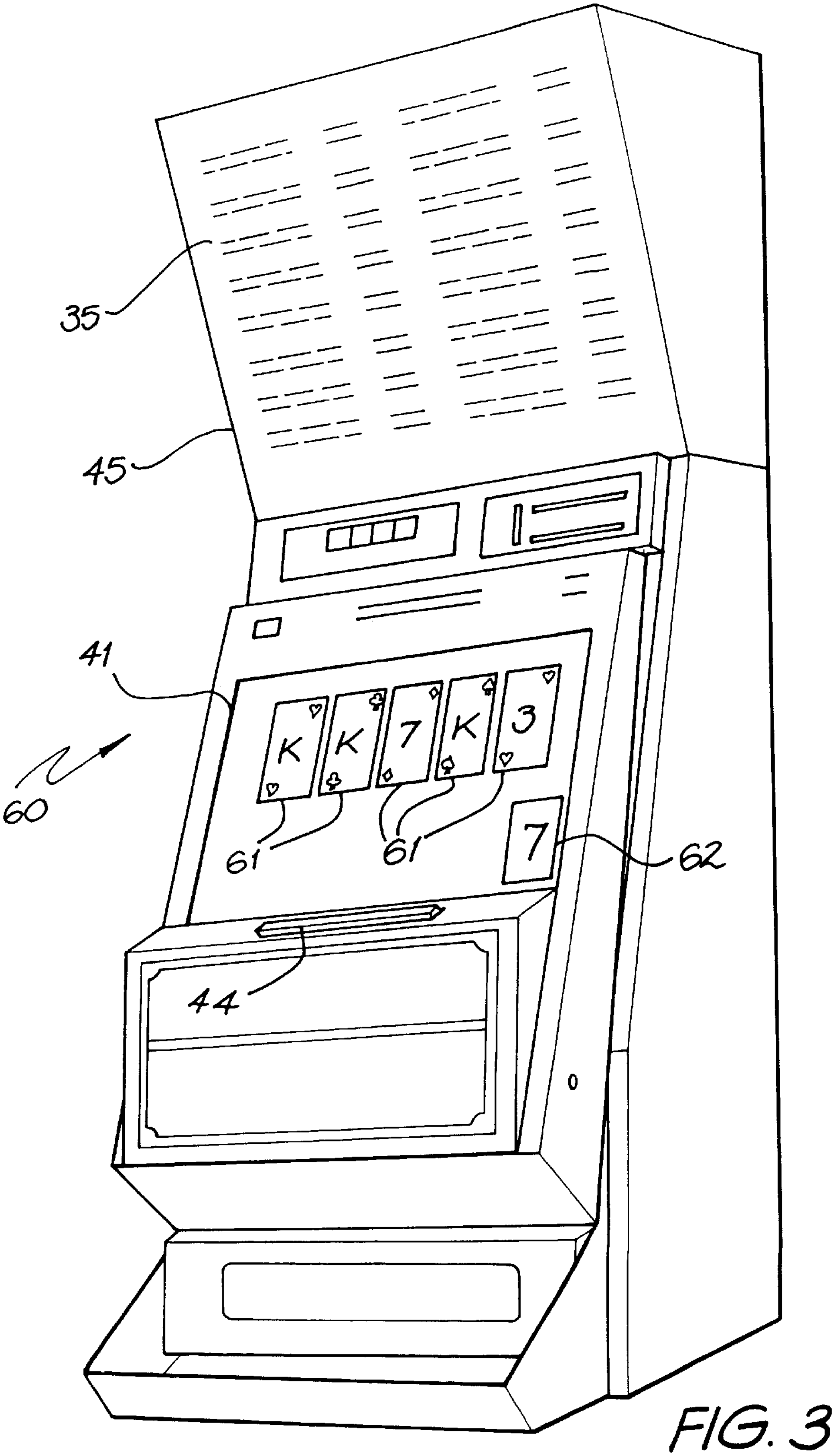
FIG. 3 illustrates a video draw poker machine incorporating an embodiment of the invention.

While the embodiments described to this point have been for gaming machines of the type having rotating reels or simulated rotating reels, the invention is equally applicable to draw poker machines an example of which is illustrated in FIG. 3. In this embodiment, the draw poker machine 60 is again provided with a video screen 41 on which are displayed five cards 61 drawn from a deck of 52 or 53 cards. The prizes displayed on artwork 35 of the top box 45 relate to standard poker hands, however, the special symbol feature of the present invention may also be provided either on a combination which is a standard winning poker hand or some other combination selected specifically for this special feature. For example, using the feature of a wildcard as our example, the prize might again be paid on the occurrence of a seven in any position on the screen which then substitutes as a King to provide a hand of four of a kind.

In this instance again, the special symbol is displayed in a window 62 provided on the video screen.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A gaming machine having game display means, and game control means arranged to control images displayed on the display means, the game control means being arranged to play a game wherein a plurality of symbols are randomly selected from a predetermined set of symbols and displayed on the display means and, if a winning combination results, the machine pays a prize, the game being characterized in that the gaming machine is provided with special symbol display means arranged to display a value of a special symbol to be used in the game, and the control means are arranged to display a special symbol from a set of special symbols which includes symbols from the predetermined set of symbols on the special symbol display means during each game and to use the special symbol when determining if the plurality of symbols include a winning combination, wherein the special symbol selection is independent of and unaffected by the selection of the result combination.

2. The gaming machine of claim 1, wherein the special symbol is a wildcard symbol such that when the special symbol occurs in a game it can substitute for any other symbol to form a winning combination.

3. The gaming machine as claimed in claim 2 wherein the display means comprises a set of rotatable reels, each carrying a plurality of symbols.

4. The gaming machine of claim 3, wherein an auxiliary display is provided to display the special symbol.

5. The gaming machine of claim 4, wherein the auxiliary display is a liquid crystal display built into the score card artwork.

6. The gaming machine as claimed in claim 2 wherein the display means is a video display arranged to display a video simulation of a set of rotating reels.

7. The gaming machine of claim 6, wherein the special symbol is displayed on the video screen when the winning symbol or combination is displayed.

8. The gaming machine of claim 7, wherein an auxiliary display is provided to display the special symbol.

9. The gaming machine of claim 8, wherein the auxiliary display is a liquid crystal display built into the score card artwork.

10. The gaming machine as claimed in claim 2 wherein the display means is a video display arranged to display a poker hand, the cards of the hand being selected from a standard 52 or 53 card deck.

11. The gaming machine of claim 10, wherein the display means is a video display arranged to display a video simulation of a set of rotating reels.

12. The gaming machine of claim 11, wherein the special symbol is displayed on the video screen when the winning symbol or combination is displayed.

13. The gaming machine of claim 10, wherein the display means is a video display arranged to display a poker hand, the cards of the hand being selected from a standard 52 or 53 card deck.

14. The gaming machine of claim 13, wherein the special symbol is displayed on the video screen when the winning symbol or combination is displayed.

15. The gaming machine of claim 1, wherein the images displayed on the game display means are displayed as a matrix of a plurality of rows and columns of symbols and the special symbol displayed on the special symbol display means is a symbol to be recognized in the game as a scatter symbol such that when a scattered combination of the special symbol occurs in a game and are displayed on the game display means, with one such symbol in each column, in an otherwise non-winning result combination, a special "scattered" prize is awarded.

16. The gaming machine in claim 1, wherein the special symbol is a bonus symbol, such that if the special symbol is included in a winning combination respectively a bonus function or a jackpot function will be invoked.

17. The gaming machine in claim 1, wherein the special symbol is a jackpot symbol, such that if the special symbol is included in a winning combination respectively a bonus function or a jackpot function will be invoked.

18. The gaming machine of claim 1, wherein the special symbol is a bonus symbol, such that if the special symbol is included in a winning combination respectively a bonus function or a jackpot function will be invoked.

19. The gaming machine as claimed in claim 18, wherein the display means comprises a set of rotatable reels, each carrying a plurality of symbols.

20. The gaming machine of claim 19, wherein an auxiliary display is provided to display the special symbol.

21. The gaming machine of claim 20, wherein the auxiliary display is a liquid crystal display built into the score card artwork.

22. The gaming machine of claim 18, wherein the display means is a video display arranged to display a video simulation of a set of rotating reels.

23. The gaming machine of claim 22, wherein the special symbol is displayed on the video screen when the winning symbol or combination is displayed.

24. The gaming machine of claim 18, wherein the display means is a video display arranged to display a poker hand the cards of the hand being selected from a standard 52 or 53 card deck.

25. The gaming machine of claim 24, wherein the special symbol is displayed on the video screen when the winning symbol or combination is displayed.

26. The gaming machine of claim 1, wherein the special symbol is a jackpot symbol, such that if the special symbol is included in a winning combination respectively a bonus function or a jackpot function will be invoked.

27. The gaming machine as claimed in claim 26, wherein the display means comprises a set of rotatable reels, each carrying a plurality of symbols.

28. The gaming machine of claim 27, wherein an auxiliary display is provided to display the special symbol.

29. The gaming machine of claim 28, wherein the auxiliary display is a liquid crystal display built into the score card artwork.

30. The gaming machine of claim 26, wherein the display means is a video display arranged to display a video simulation of a set of rotating reels.

31. The gaming machine of claim 30, wherein the special symbol is displayed on the video screen when the winning symbol or combination is displayed.

32. The gaming machine of claim 26, wherein the display means is a video display arranged to display a poker hand, the cards of the hand being selected from a standard 52 or 53 card deck.

33. The gaming machine of claim 31, wherein the special symbol is displayed on the video screen when the winning symbol or combination is displayed.

34. The gaming machine of claim 1, wherein the special symbol is displayed when the game result combination is displayed.

35. A gaming machine having game display means, and game control means arranged to control images displayed on the display means, the game control means being arranged to play a game wherein a plurality of symbols are randomly selected from a predetermined set of symbols as a game result combination and displayed on the display means and, if a winning combination results, the machine pays a prize, the game being characterized in that the display means comprises a set of rotatable reels each carrying a plurality of symbols, each result combination selected by the control means comprises a symbol from each reel, the gaming machine is provided with an auxiliary display means arranged to display a value of a special symbol to be used in the game, and the control means are arranged to display a special symbol from a set of special symbols which includes symbols from the predetermined set of symbols on the auxiliary display means during each game and to use the special symbol when determining if the plurality of symbols displayed on the display means include a winning result combination, the special symbol selection being independent of and unaffected by the selection of the result combination.

36. The gaming machine of claim 35, wherein the special symbol is displayed when the game result combination is displayed.

37. The gaming machine of claim 35, wherein the images displayed on the game display means are displayed as a matrix of a plurality of rows and columns of symbols and the special symbol displayed on the special symbol display means is a symbol to be recognized in the game as a scatter symbol such that when a scattered combination of the special symbol occurs in a game and are displayed on the game display means, with one such symbol in each column, in an otherwise non-winning result combination, a special "scattered" prize is awarded.

38. The gaming machine of claim 35, wherein the special symbol is a wildcard symbol such that when the special symbol occurs in a game it can substitute for any other symbol to form a winning combination.

39. The gaming machine of claim 35, wherein the special symbol is a bonus symbol, such that if the special symbol is included in a winning combination respectively a bonus function or a jackpot function will be invoked.

40. The gaming machine of claim 35, wherein the auxiliary display is a liquid crystal display built into the score card artwork.

41. A gaming machine having game display means, and game control means arranged to control images displayed on the display means, the game control means being arranged to play a game wherein a plurality of symbols are randomly selected from a predetermined set of symbols as a game result combination and displayed on the display means and, if a winning combination results, the machine pays a prize, the gaming machine being characterized in that the display means comprises video display arranged to display a video simulation of a set of rotating reels, each reel carrying a plurality of symbols, each result combination selected by the control means comprises a symbol from each reel, the gaming machine is provided with a special symbol display window in the image displayed on the video display, the special symbol display window being arranged to display a value of a special symbol to be used in the game, and the control means are arranged to display a special symbol from a set of special symbols which includes symbols from the predetermined set of symbols in the special symbol display window during each game and to use the special symbol when determining if the plurality of symbols displayed on the display means include a winning result combination, the special symbol selection being independent of and unaffected by the selection of the result combination.

42. The gaming machine of claim 41, wherein the special symbol is displayed when the game result combination is displayed.

43. The gaming machine of claim 41, wherein the images displayed on the game display means are displayed as a matrix of a plurality of rows and columns of symbols and the special symbol displayed on the special symbol display means is a symbol to be recognized in the game as a scatter symbol such that when a scattered combination of the special symbol occurs in a game and are displayed on the game display means, with one such symbol in each column, in an otherwise non-winning result combination, a special "scattered" prize is awarded.

44. The gaming machine of claim 41, wherein the special symbol is a wildcard symbol such that when the special symbol occurs in a game it can substitute for any other symbol to form a winning combination.

45. The gaming machine of claim 41, wherein the special symbol is a bonus symbol, such that if the special symbol is included in a winning combination respectively a bonus function or a jackpot function will be invoked.

* * * * *

UNITED STATES PATENT AND TRADEMARK OFFICE

CERTIFICATE OF CORRECTION

PATENT NO. : 6,190,254 B1
DATED : February 20, 2001
INVENTOR(S) : N. L. Bennett

It is certified that error appears in the above-identified patent and that said Letters Patent is hereby corrected as shown below:

Title page,
Item [73], correct the name of the Assignee to read:
-- Aristocrat Leisure Industries Pty Ltd. --

Signed and Sealed this

Nineteenth Day of August, 2003

JAMES E. ROGAN
*Director of the United States Patent and Trademark Office*